US012707041B2

(12) United States Patent
Lin et al.

(10) Patent No.: US 12,707,041 B2
(45) Date of Patent: Aug. 11, 2026

(54) METHOD AND APPARATUS OF DECODER SIDE INTRA MODE DERIVATION BASED MOST PROBABLE MODES LIST CONSTRUCTION IN VIDEO CODING SYSTEM

(71) Applicant: MEDIATEK INC., Hsinchu City (TW)

(72) Inventors: Yu-Cheng Lin, Hsinchu City (TW); Tzu-Der Chuang, Hsinchu City (TW); Chih-Wei Hsu, Hsinchu City (TW); Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/857,319

(22) PCT Filed: Apr. 18, 2023

(86) PCT No.: PCT/CN2023/088881
§ 371 (c)(1),
(2) Date: Oct. 16, 2024

(87) PCT Pub. No.: WO2023/202557
PCT Pub. Date: Oct. 26, 2023

(65) Prior Publication Data

US 2025/0267257 A1 Aug. 21, 2025

Related U.S. Application Data

(60) Provisional application No. 63/332,291, filed on Apr. 19, 2022.

(51) Int. Cl.
*H04N 19/11* (2014.01)
*H04N 19/159* (2014.01)
*H04N 19/176* (2014.01)

(52) U.S. Cl.
CPC .......... *H04N 19/11* (2014.11); *H04N 19/159* (2014.11); *H04N 19/176* (2014.11)

(58) Field of Classification Search
CPC .... H04N 19/11; H04N 19/159; H04N 19/176; H04N 19/593
See application file for complete search history.

(56) References Cited

U.S. PATENT DOCUMENTS 11,290,736 B1 3/2022 Wang
11,563,976 B2 1/2023 Wang
(Continued)

FOREIGN PATENT DOCUMENTS

CN 112166605 A 1/2021
CN 112385234 A 2/2021
(Continued)

OTHER PUBLICATIONS

International Search Report and Written Opinion dated Aug. 1, 2023, issued in application No. PCT/CN2023/088881.
(Continued)

*Primary Examiner* — Francis Geroleo
(74) *Attorney, Agent, or Firm* — McClure, Qualey & Rodack, LLP

(57) ABSTRACT

A method and apparatus for generating an extended MPM (Most Probable Modes) list by adding the target DIMD candidate and at least one neighbouring mode of the target DIMD candidate to an initial MPM list. A target DIMD candidate is determined for the current block based on a DIMD process using statistics or histogram of angle field derived from a template of the current block. At least one neighbouring mode of the target DIMD candidate is generated by adding an offset to a corresponding mode number of the target DIMD candidate. The offset corresponds to a non-zero integer. An extended MPM (Most Probable
(Continued)

Modes) list is generated by adding the target DIMD candidate and at least one neighbouring mode of the target DIMD candidate to an initial MPM list. The current block is encoded or decoded using information that includes the extended MPM list.

9 Claims, 5 Drawing Sheets

(56) References Cited

U.S. PATENT DOCUMENTS

| | | | | |
|---|---|---|---|---|
| 11,956,418 | B2 | 4/2024 | Lee | |
| 2017/0332084 | A1 | 11/2017 | Seregin | |
| 2021/0076045 | A1 | 3/2021 | Xue | |
| 2022/0086426 | A1 | 3/2022 | Lee | |
| 2022/0201281 | A1* | 6/2022 | Li | H04N 19/176 |
| 2023/0114696 | A1 | 4/2023 | Li | |
| 2025/0119548 | A1* | 4/2025 | Cao | H04N 19/176 |

FOREIGN PATENT DOCUMENTS

| | | | |
|---|---|---|---|
| EP | 3301916 | A1 | 4/2018 |
| EP | 4268453 | B1 | 5/2025 |
| KR | 20130027975 | A | 3/2013 |
| WO | 2018054269 | A1 | 3/2018 |
| WO | 2020056779 | A1 | 3/2020 |
| WO | 2020145735 | A1 | 7/2020 |
| WO | 2020228566 | A1 | 11/2020 |

OTHER PUBLICATIONS

International Search Report and Written Opinion dated Jul. 31, 2023, issued in application No. PCT/CN2023/089143.

Indian language office action with translation dated Jan. 6, 2026, issued in application No. IN 202427088548.

Extended European Search Report dated Feb. 4, 2026, issued in application No. EP 23791212.6.

Xiu, X., et al.; "Decoder-side intra mode derivation;" Joint Video Exploration Team (JVET) of ITU-T SG 16 WP 3 and ISO/IEC JTC 1/SC 29/WG 11; May 2016; pps. 1-5.

Mora, E., et al.; "CES-related: Decoder-side Intra Mode Derivation;" Joint Video Experts Team (JVET) of ITU-T SG 16 WP 3 and ISO/IEC JTC 1/SC 29/WG11; Oct. 2018; pps. 1-8.

Seregin, V., et al.; "Block shape dependent intra mode coding;" Joint Video Exploration Team (JVET) of ITU-T SG 16 WP 3 and ISO/IEO JTC 1/SC 29NVG 11; Oct. 2016; pps. 1-3.

* cited by examiner

METHOD AND APPARATUS OF DECODER SIDE INTRA MODE DERIVATION BASED MOST PROBABLE MODES LIST CONSTRUCTION IN VIDEO CODING SYSTEM

CROSS REFERENCE TO RELATED APPLICATIONS

The present invention is a non-Provisional Application of and claims priority to U.S. Provisional Patent Application No. 63/332,291, filed on Apr. 19, 2022. The U.S. Provisional Patent Application is hereby incorporated by reference in its entirety.

FIELD OF THE INVENTION

The present invention relates to video coding system. In particular, the present invention relates to MPM (Most Probable Modes) list construction using Decoder Side Intra Mode Derivation (DIMD) in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. The use of DIMD candidates for the MPM list has shown improvement in coding efficiency. In the present invention, method and apparatus to further improve the DIMD-based MPM are disclosed.

BRIEF SUMMARY OF THE INVENTION

A method and apparatus for video coding are disclosed. According to the method, pixel data associated with a current block at an encoder side or coded data associated with the current block to be decoded at a decoder side are received. A target DIMD (Decoder Side Intra Mode Derivation) candidate is determined for the current block based on a DIMD process using statistics or histogram of angle field derived from a template of the current block. At least one neighbouring mode of the target DIMD candidate is generated by adding an offset to a corresponding mode number of the target DIMD candidate, and wherein the offset corresponds to a non-zero integer. An extended MPM (Most Probable Modes) list is generated by adding the target DIMD candidate and said at least one neighbouring mode of the target DIMD candidate to an initial MPM list. The current block is encoded or decoded using information comprising the extended MPM list.

In one embodiment, said at least one neighbouring mode of the target DIMD candidate corresponds to a plurality of neighbouring modes of the target DIMD candidate and the plurality of neighbouring modes of the target DIMD candidate are added to the initial MPM list in an interleaved manner according to distances between the plurality of neighbouring modes of the target DIMD candidate and the target DIMD candidate. For example, the plurality of neighbouring modes of the target DIMD candidate may be added to the initial MPM in an order according to (the target DIMD candidate−1), (the target DIMD candidate+1), (the target DIMD candidate−2), (the target DIMD candidate+2), and so on.

In one embodiment, a second target DIMD candidate is generated for the current block based on the DIMD process and the second target DIMD candidate is added to the initial MPM list at a location immediately after the target DIMD candidate. In another embodiment, at least one second neighbouring mode of the second target DIMD candidate is generated by adding a second offset to a corresponding mode number of the second target DIMD candidate and the second offset corresponds to a non-zero integer, and wherein said at least one second neighbouring mode of the second target DIMD candidate is added to the initial MPM list to form the extended MPM list. In one embodiment, said at least one second neighbouring mode of the second target DIMD candidate corresponds to a plurality of second neighbouring modes of the second target DIMD candidate, and the plurality of second neighbouring modes of the second target DIMD candidate are added to the initial MPM list in an interleaved manner according to distances between the plurality of second neighbouring modes of the second target DIMD candidate and the second target DIMD candidate. For example, the plurality of second neighbouring modes of the second target DIMD candidate may be added to the initial MPM in an order according to (the second target DIMD candidate−1), (the second target DIMD candidate+1), (the second target DIMD candidate−2), (the second target DIMD candidate+2), and so on. In one embodiment, said at least one second neighbouring mode of the second target DIMD candidate is added to the initial MPM list at the location immediately after said at least one neighbouring mode of the target DIMD candidate.

In one embodiment, a pruning process is applied to the extended MPM list after a new candidate is added.

DETAILED DESCRIPTION OF THE INVENTION

Figure 1A:
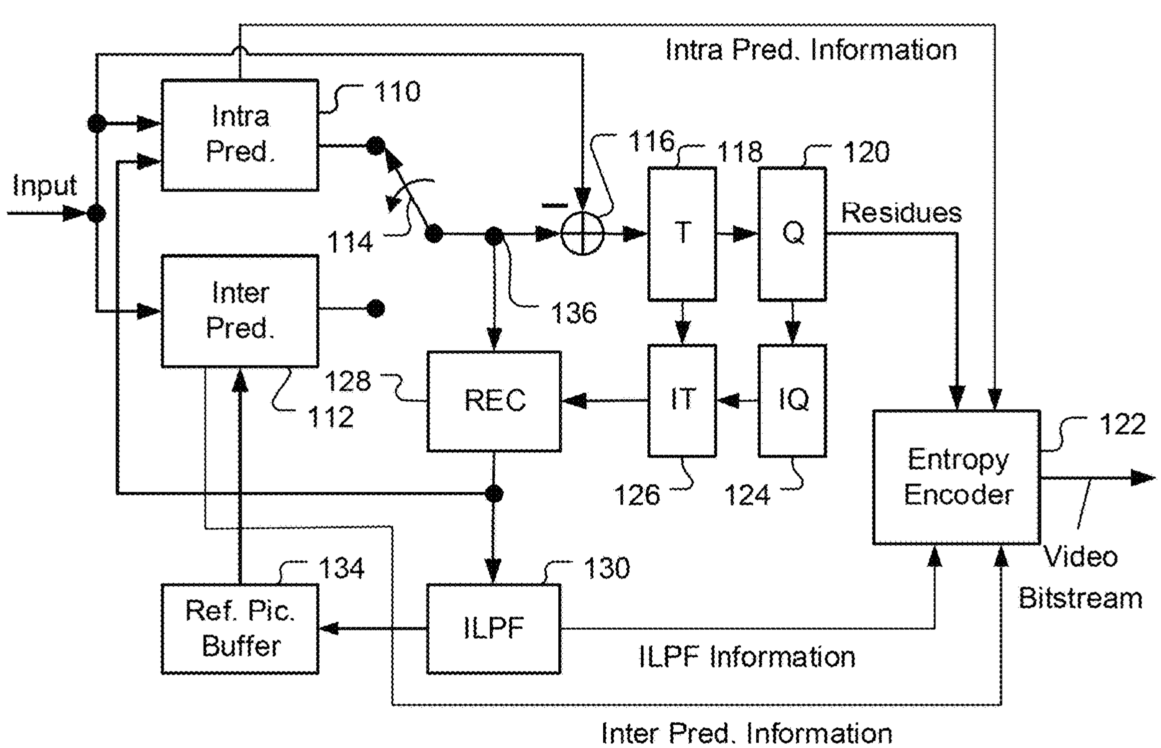
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to “one embodiment,” “an embodiment,” or similar language mean that a particular feature, structure, or characteristic described in connection with the embodiment may be included in at least one embodiment of the present invention. Thus, appearances of the phrases “in one embodiment” or “in an embodiment” in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

The VVC standard incorporates various new coding tools to further improve the coding efficiency over the HEVC standard. Among various new coding tools, some coding tools relevant to the present invention are reviewed as follows.

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 2, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 3A:
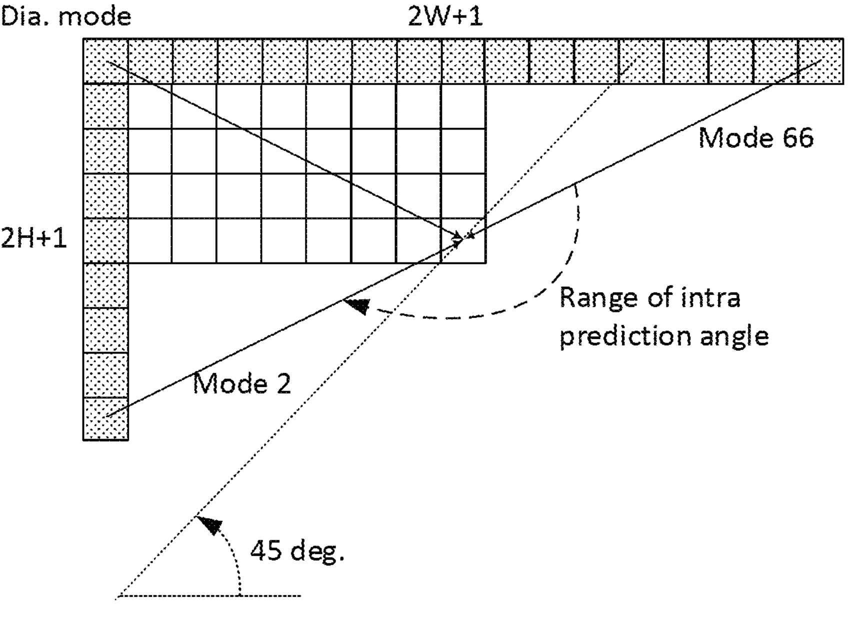
FIGS. 3A-B illustrate examples of wide-angle intra prediction a block with width larger than height (FIG. 3A) and a block with height larger than width (FIG. 3B).
Figure 3B:
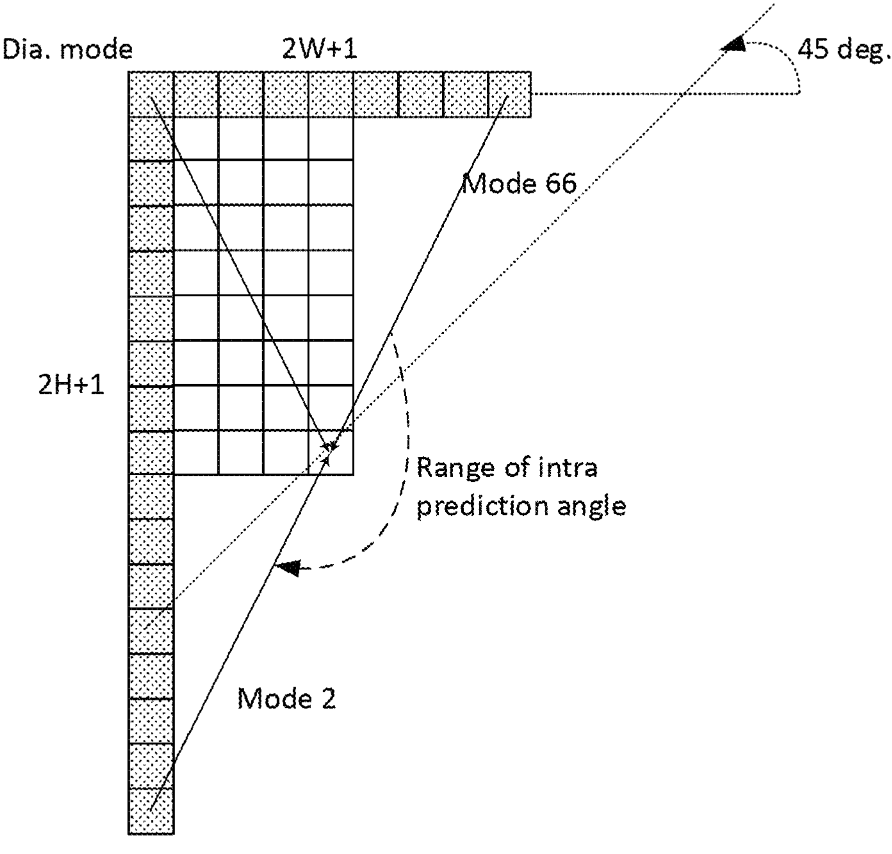

To support these prediction directions, the top reference with length 2W+1, and the left reference with length 2H+1, are defined as shown in FIG. 3A and FIG. 3B respectively.

The number of replaced modes in wide-angular direction mode depends on the aspect ratio of a block. The replaced intra prediction modes are illustrated in Table 1.

TABLE 1

Intra prediction modes replaced by wide-angular modes

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

Figure 4:
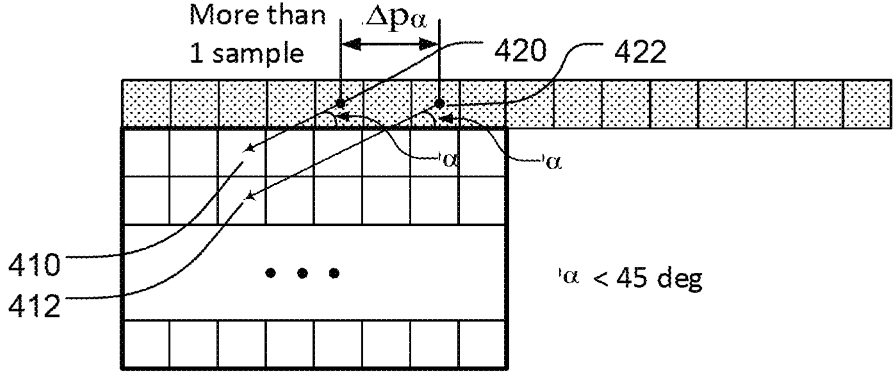
FIG. 4 illustrate examples of two vertically-adjacent predicted samples using two non-adjacent reference samples in the case of wide-angle intra prediction.

As shown in FIG. 4, two vertically-adjacent predicted samples (samples 410 and 412) may use two non-adjacent reference samples (samples 420 and 422) in the case of wide-angle intra prediction. Hence, low-pass reference samples filter and side smoothing are applied to the wide-angle prediction to reduce the negative effect of the increased gap $\Delta p_{\alpha}$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Most Probable Mode (MPM) List Generation

To keep the complexity of the most probable mode (MPM) list generation low, an intra mode coding method with 6 MPMs is used by considering two available neighbouring intra modes. The following three aspects are considered to construct the MPM list:

Default intra modes
Neighbouring intra modes
Derived intra modes.

A unified 6-MPM list is used for intra blocks irrespective of whether MRL (Multiple Reference Line) and ISP (Intra Sub-Partitions) coding tools are applied or not. The MPM list is constructed based on intra modes of the left and above neighbouring block. Suppose the mode of the left is denoted as Left and the mode of the above block is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→{Planar, Max, DC, Max−1, Max+1, Max−2}
- If Left and Above are both angular and they are different:
  - Set a mode Max as the larger mode in Left and Above
  - if the difference of mode Left and Above is in the range of 2 to 62, inclusive
    - MPM list→{Planar, Left, Above, DC, Max−1, Max+1}
  - Otherwise
    - MPM list→{Planar, Left, Above, DC, Max−2, Max+2}
- If Left and Above are both angular and they are the same:
  - MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Decoder Side Intra Mode Derivation (DIMD)

During the development of new coding standard beyond he VVC, various new coding tools are being evaluated in a test platform named Enhanced Compression Model (ECM). Among various coding tools, a new intra prediction mode, named Decoder Side Intra Mode Derivation (DIMD) has been disclosed. When DIMD is applied, two intra modes are derived from the reconstructed neighbour samples, and those two predictors are combined with the planar mode predictor with the weights derived from the gradients as described in JVET-00449 (Mohsen Abdol, et. al., "Non-CE3: Decoder-side Intra Mode Derivation with Prediction Fusion Using Planar", Joint Video Experts Team (JVET) of ITU-T SG 16 WP 3 and ISO/IEC JTC 1/SC 29/WG 11, 15th Meeting: Gothenburg, SE, 3-12 Jul. 2019, document: JVET-00449).

According to DIMD, Histogram of Gradient (HoG) with 65 entries, corresponding to the 65 angular modes are calculated. Amplitudes of these entries are determined during the texture gradient analysis.

In the first step, DIMD picks a template of T columns and lines from respectively left side and above side of the current block. This area is used as the reference for the gradient based intra prediction modes derivation.

In the second step, the horizontal and vertical Sobel filters are applied on all 3×3 window positions, centered on the pixels of the middle line of the template to derive the gradients. At each window position, Sobel filters calculate the intensity of pure horizontal and vertical directions as $G_x$ and $G_y$, respectively. Then, the texture angle of the window is calculated as:

$$\text{angle} = \arctan(G_x / G_y), \tag{1}$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \tag{2}$$

The division operations in weight derivation is performed utilizing the same lookup table (LUT) based integerization scheme used by the CCLM (Cross Colour Linear Model). For example, the division operation in the orientation calculation $$\text{Orient} = G_y / G_x \tag{3}$$

is computed by the following LUT-based scheme:

$$x = \text{Floor}(\text{Log2}(Gx)),$$

$$normDiff = ((Gx << 4) >> x)\ \&\ 15,$$

$$x += (3 + (normDiff\ != 0)\ ?\ 1 : 0),$$

and $$\text{Orient} = (Gy * (DivSigTable[normDiff] \mid 8) + (1 << (x - 1))) >> x.$$

In the above equations, DivSigTable[16]={0, 7, 6, 5, 5, 4, 4, 3, 3, 2, 2, 1, 1, 1, 1, 0}.

Derived intra modes are included into the primary list of intra most probable modes (MPM). Therefore, the DIMD process is performed before the MPM list is constructed. The primary derived intra mode of a DIMD block is stored with the block and is used for MPM list construction of the neighbouring blocks.

Secondary MPM

Figure 5:
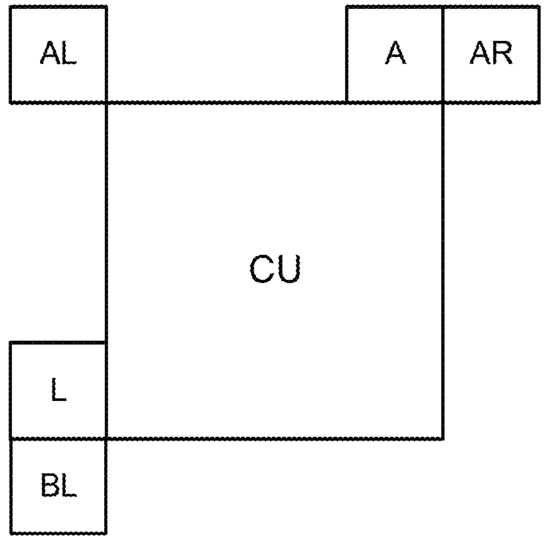
FIG. 5 illustrates an example of MPM list construction using the intra prediction modes from neighbouring blocks of the left (L), above (A), below-left (BL), above-right (AR), and above-left (AL).

Secondary MPM lists is introduced as described in JVET-D0114 (Vadim Seregin, et. al., "Block shape dependent intra mode coding", Joint Video Experts Team (JVET) of ITU-T SG 16 WP 3 and ISO/IEC JTC 1/SC 29/WG 11, 4th Meeting: Chengdu, CN, 15-21 Oct. 2016, document: JVET-D0114). The existing primary MPM (PMPM) list consists of 6 entries and the secondary MPM (SMPM) list includes 16 entries. A general MPM list with 22 entries is constructed first, and then the first 6 entries in this general MPM list are included in the PMPM list, and the rest of entries form the SMPM list. The first entry in the general MPM list is the Planar mode. The remaining entries are composed of the intra modes of the left (L), above (A), below-left (BL), above-right (AR), and above-left (AL) neighbouring blocks as shown in FIG. 5, the directional modes with added offset from the first two available directional modes of neighbouring blocks, and the default modes.

If a CU block is vertically oriented, the order of neighbouring blocks is A, L, BL, AR, AL; otherwise, it is L, A, BL, AR, AL.

A PMPM flag is parsed first; if equal to 1 then a PMPM index is parsed to determine which entry of the PMPM list is selected; otherwise the SPMPM flag is parsed to determine whether to parse the SMPM index or the remaining modes.

The use of DIMD candidates for the MPM list has shown improvement in coding efficiency. In the present invention, method and apparatus to further improve the DIMD-based MPM are disclosed.

Figure 2:
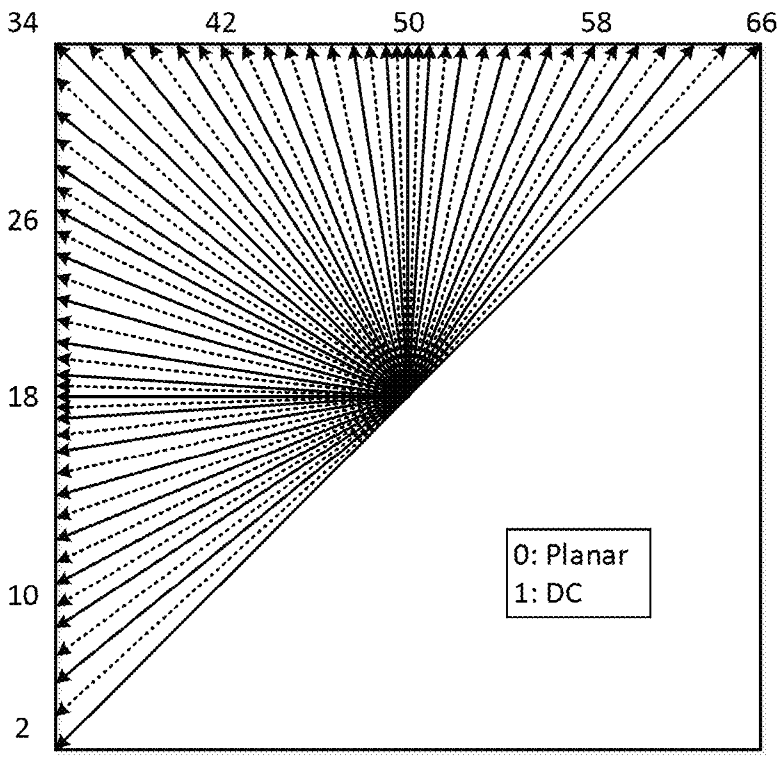
FIG. 2 shows the intra prediction modes as adopted by the VVC video coding standard.

A new decoder-side intra mode derivation (DIMD) based derived mode for MPM list construction is disclosed in the present invention. According to embodiments of the present invention, when a video codec constructs the MPM list for the current block, derived mode based on DIMD mode of the current block may be added into the MPM list during list construction with some constraints such as block size, block aspect ratio or template matching costs. The derived mode based on the DIMD mode of the current block can be the DIMD mode−1, DIMD mode+1, DIMD mode−2, DIMD mode+2, DIMD mode−3, DIMD mode+3, DIMD mode−4, DIMD mode+4 and so on. The intra prediction modes according to VVC comprise 65 directional modes, a planar mode (i.e., mode 0) and a DC mode (i.e., mode 1). As shown in FIG. 2, the directions of neighbouring intra modes (except for mode 0 and mode 1) are very similar. The differences in the directional angle between DIMD±1 and DIMD is very small. The differences in the directional angle between DIMD±n and DIMD become larger when the offset (i.e., n) becomes larger. The DIMD±n modes are referred as alternative DIMD modes in this disclosure.

Pruning or redundancy check may also be applied to the MPM list when a decoder-side intra mode derivation based derived mode is inserted into the MPM list.

In one embodiment, when the MPM list is constructed, DIMD derived modes are directly added into the MPM list without any constraints.

In another embodiment, when the MPM list is constructed, DIMD derived modes are added into the MPM list with (block width+block height) constraints. For example, when (block width+block height) is less than a threshold, DIMD derived modes will not be inserted into the MPM list; otherwise (i.e., (block width+block height) is greater than or equal to the threshold), DIMD derived modes are added, where the threshold is N samples and N is greater than or equal to 0.

In another embodiment, when the MPM list is constructed, DIMD derived modes are added into the MPM list with block aspect ratio constraints. When the block width to the block height ratio is less than a threshold, DIMD derived modes will not be inserted into the MPM list; otherwise (i.e., the block aspect ratio is greater than or equal to the threshold), DIMD derived modes are added, where threshold is N and N can be an integer or fractional number.

In another embodiment, when the MPM list is constructed, only odd DIMD derived modes are added into the MPM list. In other words, DIMD mode−2, DIMD mode+2, DIMD mode−4, DIMD mode+4 and so on are added to the MPM list if the DIMD mode is an odd number. Similarly, DIMD mode−1, DIMD mode+1, DIMD mode−3, DIMD mode+3 and so on are added to the MPM list if DIMD mode is an even number.

In another embodiment, when the MPM list is constructed, only even DIMD derived modes that are added into the MPM list. In other words, DIMD mode−1, DIMD mode+1, DIMD mode−3, DIMD mode+3 and so on are added to the MPM list if DIMD mode is an odd number. Similarly, DIMD mode−2, DIMD mode+2, DIMD mode−4, DIMD mode+4 and so on are added to the MPM list if DIMD mode is an even number.

In another embodiment, when the MPM list is constructed, the template matching cost will be computed by comparing the current reconstruction L-shape template and reference samples. If the cost is smaller than a threshold, when MPM is constructed, DIMD derived modes are added into MPM list; otherwise (i.e., the template matching cost is greater than or equal to the threshold), DIMD derived modes are not added into the MPM list.

In another embodiment, when the MPM list is constructed, derived modes and DIMD derived modes are added into MPM list from the closer mode derivation distance to further mode derivation distance. For example, the order of derived mode and DIMD derived modes are added into MPM list as follows:

2$^{nd}$ MPM mode−1, 2$^{nd}$ MPM mode+1, 3$^{rd}$ MPM mode−1, 3$^{rd}$ MPM mode+1, 4$^{th}$ MPM mode−1, 4$^{th}$ MPM mode+1, DIMD derived mode−1, DIMD derived mode+1, 2$^{nd}$ MPM mode−2, 2$^{nd}$ MPM mode+2, 3$^{rd}$ MPM mode−2, 3$^{rd}$ MPM mode+2, 4$^{th}$ MPM mode−2, 4$^{th}$ MPM mode+2, DIMD derived mode−2, DIMD derived mode +2, etc.

As shown in the above list, DIMD derived mode−1 and DIMD derived mode+1 (i.e., DIMD derived modes with offset distance equal to 1) are added after alternative MPM modes with offset distance equal to 1. The alternative MPM modes refer to the derived modes by adding offsets to the MPM candidate (i$^{th}$ MPM mode±n, where n corresponds to an offset). In other words, the alternative DIMD modes (i.e., DIMD mode±n) are inserted into the MPM list in an interleaved manner, i.e., one or more i$^{th}$ MPM mode±1, DIMD mode±1, one or more i$^{th}$ MPM mode±2, DIMD mode±2, one or more i$^{th}$ MPM mode±3, DIMD mode±3, etc. While the above list includes 2$^{nd}$ MPM mode, 3$^{rd}$ MPM mode and 4$^{th}$ MPM mode, the present invention is not limited to this particular number of MPM candidates. We may generate alternative MPM candidates for more MPM candidates (e.g. also including 5$^{th}$ MPM mode) or for less more MPM candidates (e.g. only including 2$^{nd}$ MPM mode and 3$^{rd}$ MPM mode).

Figure 1B:
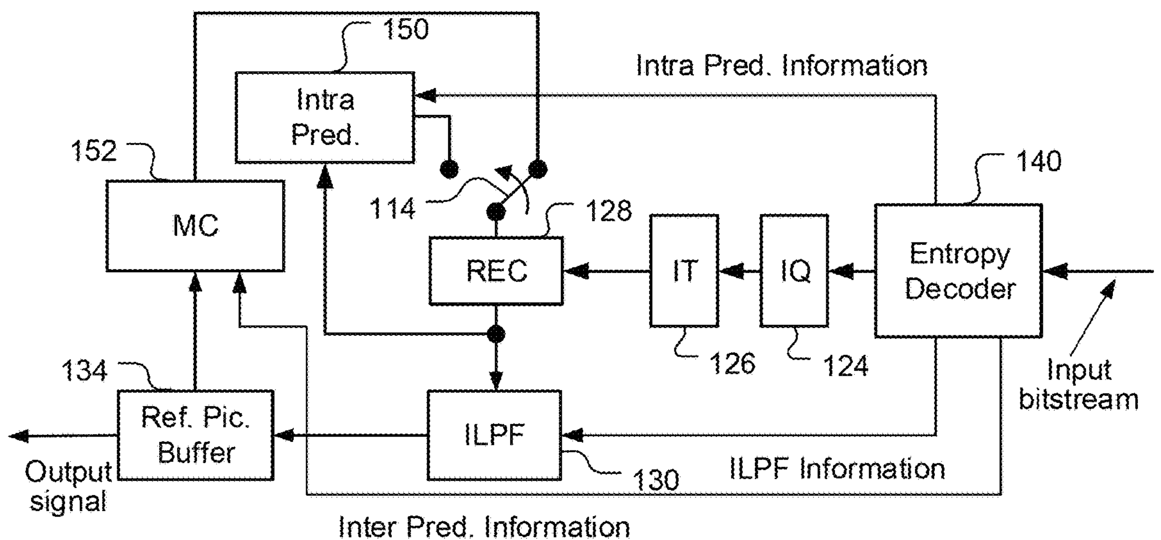
FIG. 1B illustrates a corresponding decoder for the encoder in FIG. 1A.

Any of the foregoing proposed Most Probable Mode (MPM) list construction methods using DIMD can be implemented in encoders and/or decoders. For example, any of the proposed methods can be implemented in predictor derivation module of an encoder (e.g. Intra pred. 110 in FIG. 1A), and/or a predictor derivation module of a decoder (e.g. Intra pred. 150 in FIG. 1B). Alternatively, any of the proposed methods can be implemented as a circuit coupled to the predictor derivation module of the encoder and/or the predictor derivation module of the decoder, so as to provide the information needed by the predictor derivation module.

Figure 6:
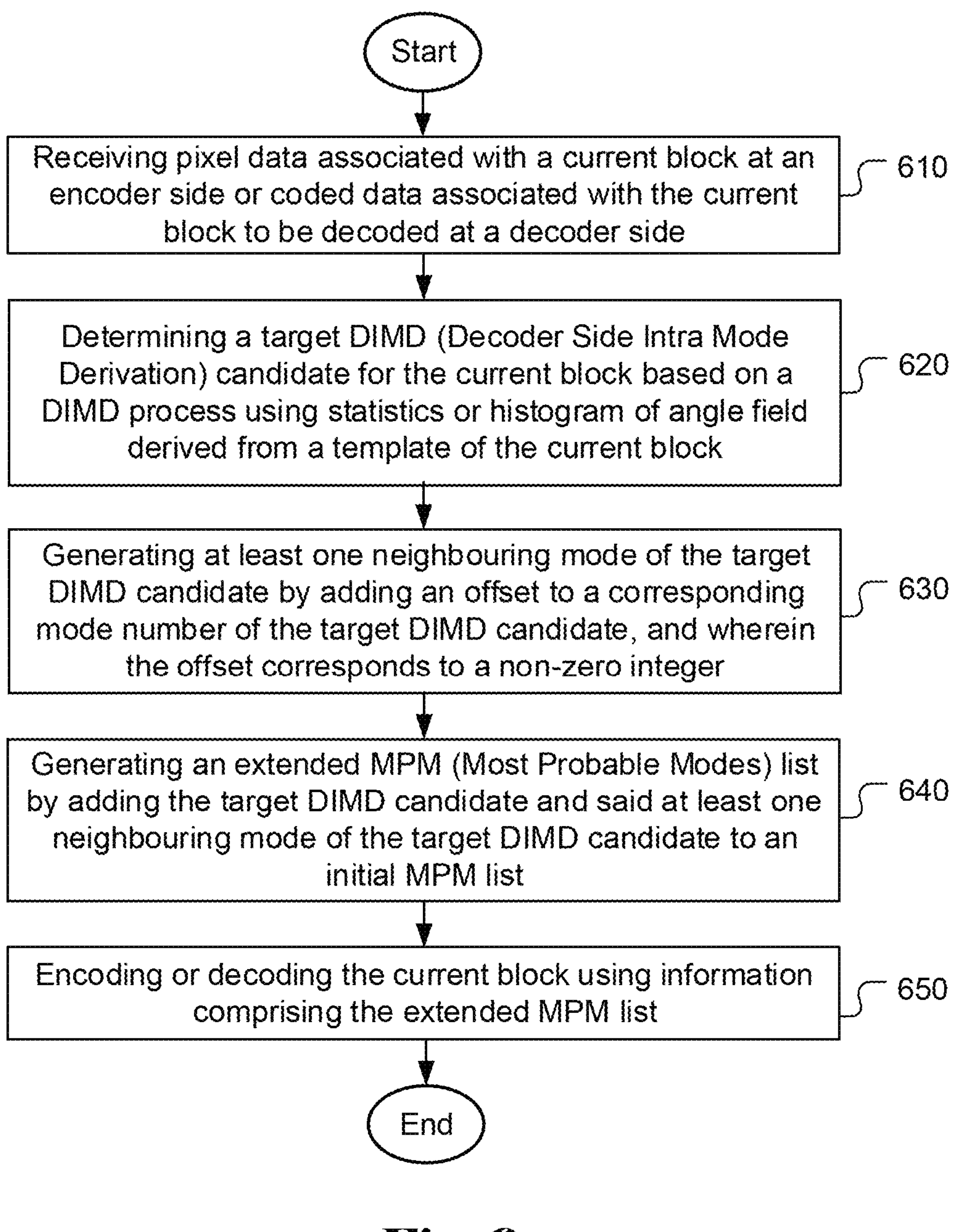
FIG. 6 illustrates a flowchart of an exemplary video decoding system that utilizes one or more neighbouring modes of a DIMD derived candidate for MPM list construction according to an embodiment of the present invention.

FIG. 6 illustrates a flowchart of an exemplary video coding system that utilizes one or more neighbouring modes of a DIMD derived candidate for MPM list construction according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, pixel data associated with a current block at an encoder side or coded data associated with the current block to be decoded at a decoder side are received in step 610. A target DIMD (Decoder Side Intra Mode Derivation) candidate is determined for the current block based on a DIMD process using statistics or histogram of angle field derived from a template of the current block in step 620. At least one neighbouring mode of the target DIMD candidate is generated by adding an offset to a corresponding mode number of the target DIMD candidate in step 630, and wherein the offset corresponds to a non-zero integer. An extended MPM (Most Probable Modes) list is generated by adding the target DIMD candidate and said at least one neighbouring mode of the target DIMD candidate to an initial MPM list in step 640. The current block is encoded or decoded using information comprising the extended MPM list in step 650.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving pixel data associated with a current block at an encoder side or coded data associated with the current block to be decoded at a decoder side;

determining a target DIMD (Decoder Side Intra Mode Derivation) candidate for the current block based on a DIMD process using statistics or histogram of angle field derived from a template of the current block;

generating at least one neighbouring mode of the target DIMD candidate by adding an offset to a corresponding mode number of the target DIMD candidate, and wherein the offset corresponds to a non-zero integer;

generating an extended MPM (Most Probable Modes) list by adding the target DIMD candidate and said at least one neighbouring mode of the target DIMD candidate to an initial MPM list, wherein said at least one neighbouring mode of the target DIMD candidate corresponds to a plurality of neighbouring modes of the target DIMD candidate and the plurality of neighbouring modes of the target DIMD candidate are added to the initial MPM list in an interleaved manner according to distances between the plurality of neighbouring modes of the target DIMD candidate and the target DIMD candidate; and encoding or decoding the current block using information comprising the extended MPM list.

2. The method of claim 1, wherein the plurality of neighbouring modes of the target DIMD candidate are added to the initial MPM in an order according to (the target DIMD candidate−1), (the target DIMD candidate+1), (the target DIMD candidate−2), (the target DIMD candidate+2), and so on.

3. The method of claim 1, wherein a second target DIMD candidate is generated for the current block based on the DIMD process and the second target DIMD candidate is added to the initial MPM list at a location immediately after the target DIMD candidate.

4. The method of claim 3, wherein at least one second neighbouring mode of the second target DIMD candidate is generated by adding a second offset to a corresponding mode number of the second target DIMD candidate and the second offset corresponds to a non-zero integer, and wherein said at least one second neighbouring mode of the second target DIMD candidate is added to the initial MPM list to form the extended MPM list.

5. The method of claim 4, wherein said at least one second neighbouring mode of the second target DIMD candidate corresponds to a plurality of second neighbouring modes of the second target DIMD candidate, and the plurality of second neighbouring modes of the second target DIMD candidate are added to the initial MPM list in an interleaved manner according to distances between the plurality of second neighbouring modes of the second target DIMD candidate and the second target DIMD candidate.

6. The method of claim 5, wherein the plurality of second neighbouring modes of the second target DIMD candidate are added to the initial MPM in an order according to (the second target DIMD candidate−1), (the second target DIMD candidate+1), (the second target DIMD candidate−2), (the second target DIMD candidate+2), and so on.

7. The method of claim 4, wherein said at least one second neighbouring mode of the second target DIMD candidate is added to the initial MPM list at the location immediately after said at least one neighbouring mode of the target DIMD candidate.

8. The method of claim 1, wherein a pruning process is applied to the extended MPM list after a new candidate is added.

9. An apparatus for video coding, the apparatus comprising one or more electronics or processors arranged to:

receive pixel data associated with a current block at an encoder side or coded data associated with the current block to be decoded at a decoder side;

determine a target DIMD (Decoder Side Intra Mode Derivation) candidate for the current block based on a DIMD process using statistics or histogram of angle field derived from a template of the current block;

generate at least one neighbouring mode of the target DIMD candidate by adding an offset to a corresponding mode number of the target DIMD candidate, and wherein the offset corresponds to a non-zero integer;

generate an extended MPM (Most Probable Modes) list by adding the target DIMD candidate and said at least one neighbouring mode of the target DIMD candidate to an initial MPM list, wherein said at least one neighbouring mode of the target DIMD candidate corresponds to a plurality of neighbouring modes of the target DIMD candidate and the plurality of neighbouring modes of the target DIMD candidate are added to the initial MPM list in an interleaved manner according to distances between the plurality of neighbouring modes of the target DIMD candidate and the target DIMD candidate; and encode or decode the current block using information comprising the extended MPM list.

* * * * *